United States Patent [19]
Jannotta

[11] Patent Number: 5,705,733
[45] Date of Patent: Jan. 6, 1998

[54] APPARATUS FOR MONITORING LIQUID LEVELS AND METHODS FOR CALIBRATING SAME

[76] Inventor: Louis J. Jannotta, 7940 Teton Rd., Orland Park, Ill. 60462

[21] Appl. No.: 589,966

[22] Filed: Jan. 23, 1996

[51] Int. Cl.$^6$ .............................. G01F 23/32; G01F 25/00
[52] U.S. Cl. .............................. 73/1 H; 73/305; 74/22 R
[58] Field of Search .............................. 73/305, 1 H, 1.73; 74/22 R

[56] References Cited

U.S. PATENT DOCUMENTS

| | | | |
|---|---|---|---|
| 3,113,448 | 12/1963 | Hardway, Jr. et al. | 73/1 H X |
| 3,146,620 | 9/1964 | Morrill, Jr. | 73/1 H X |
| 3,830,090 | 8/1974 | Hersch et al. | 73/1 H |
| 3,956,681 | 5/1976 | Vail et al. | 250/570 X |
| 3,975,633 | 8/1976 | Larkin | 250/570 |
| 4,342,996 | 8/1982 | Jannotta | 340/870.16 |

OTHER PUBLICATIONS

GPE Controls Installation Manual, 31-422-1, Issue 2, pp. 6-8, Nov. 1989.

*Primary Examiner*—Thomas P. Noland
*Attorney, Agent, or Firm*—Frank J. Uxa

[57] ABSTRACT

Apparatus for monitoring the height of the liquid in a liquid-containing tank equipped with a height gage including an adjusting disc coupled to the gage shaft, an increment wheel coupled to the adjusting disc and being rotatable in response to rotation of the gage shaft, and a coupling member secured to the increment wheel and the shaft of an encoder assembly. The coupling member is effective to transmit liquid height information from the increment wheel to the encoder assembly. Methods for calibrating such apparatus are provided.

20 Claims, 2 Drawing Sheets

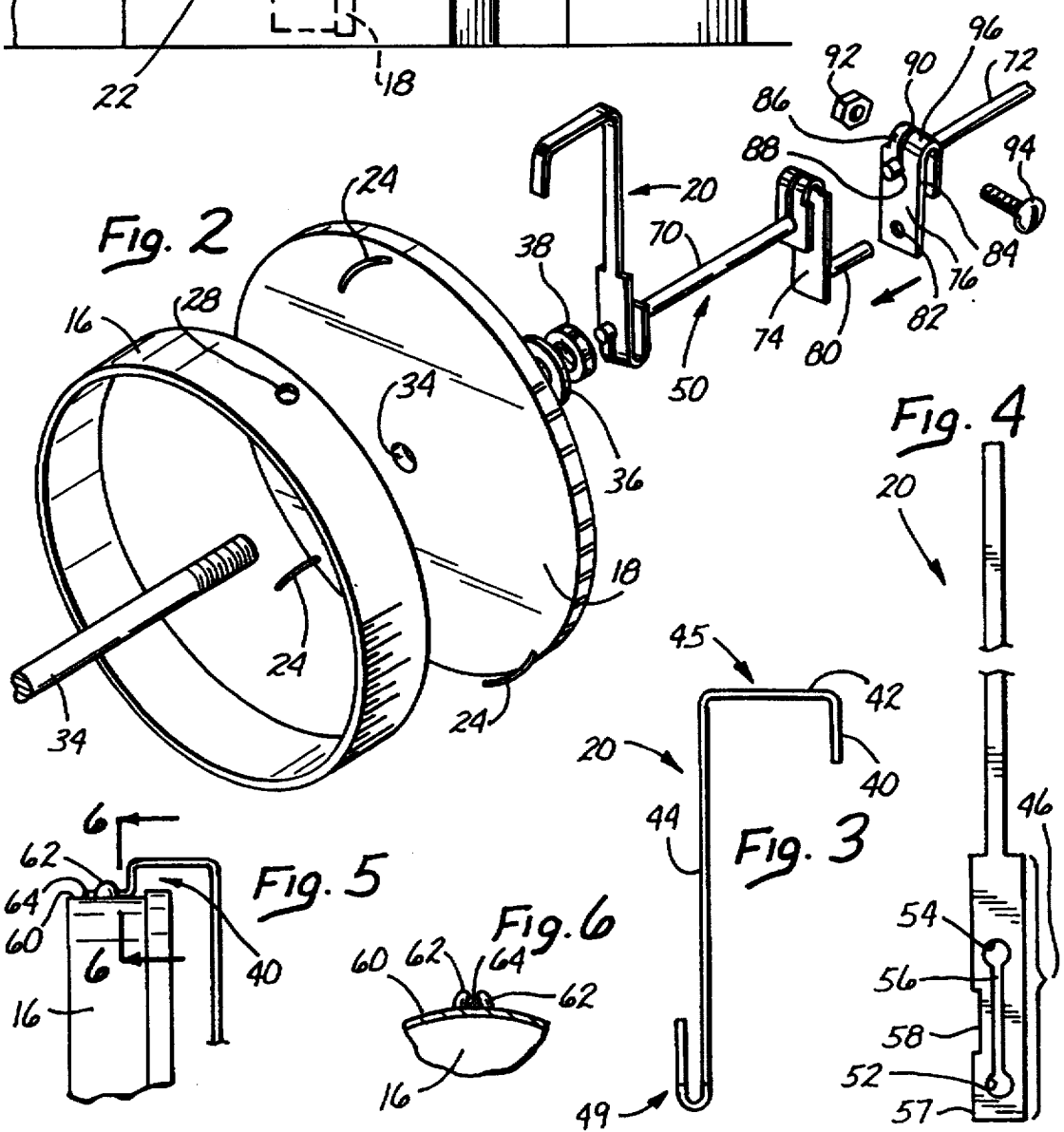

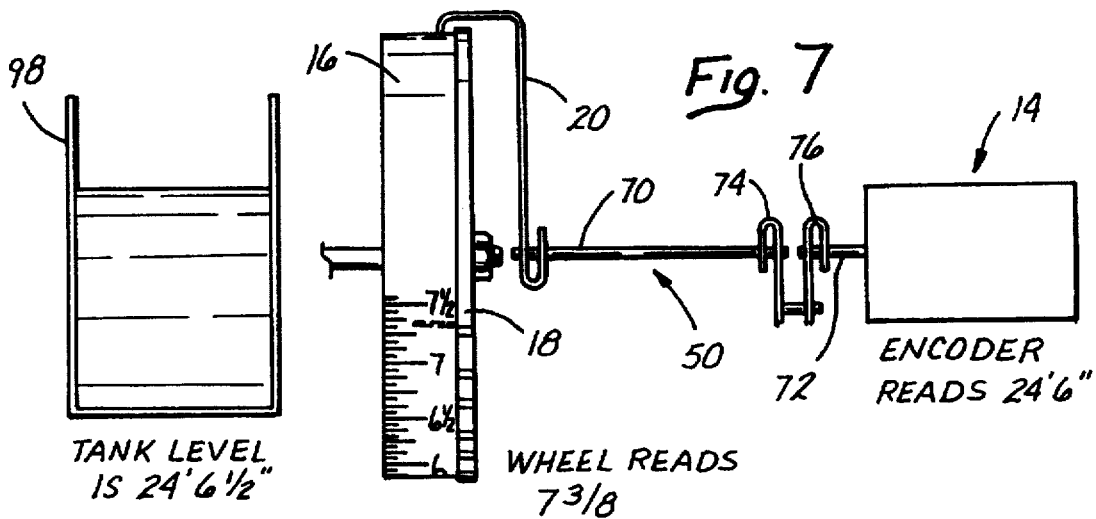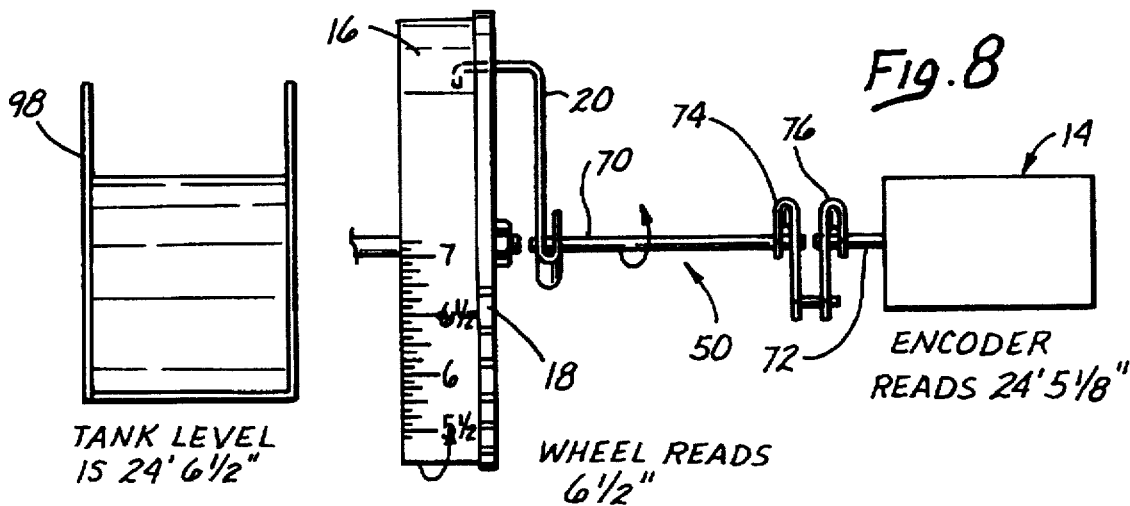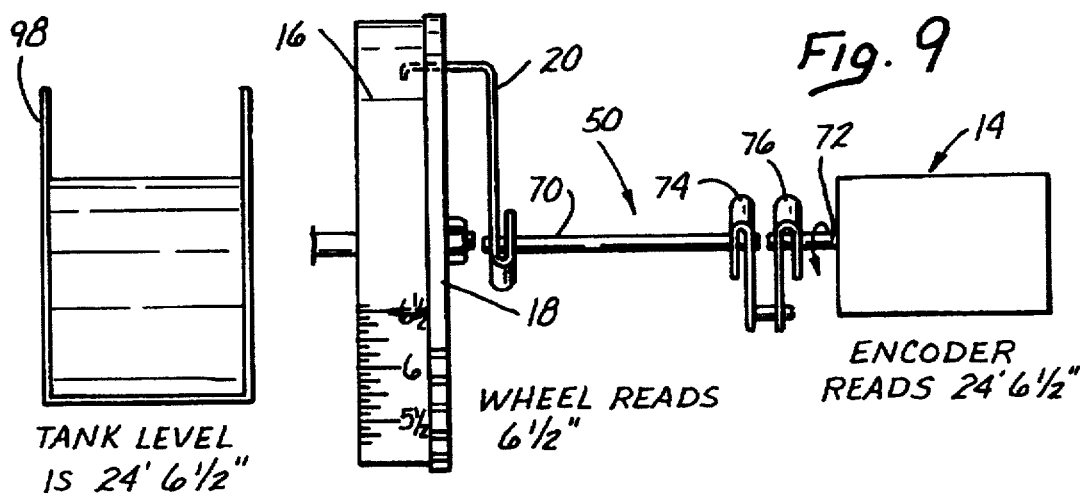

APPARATUS FOR MONITORING LIQUID LEVELS AND METHODS FOR CALIBRATING SAME

BACKGROUND OF THE INVENTION

The present invention relates to apparatus for monitoring the level or height of liquid in a liquid-containing tank and to methods for calibrating such apparatus. More particularly, the invention relates to such monitoring apparatus which employ a new coupling member or arm to transmit liquid level information from a mechanical gage to an encoder assembly. Methods for calibrating such apparatus, as well as configurations of the coupling arm are also disclosed.

The level or height of liquid in a liquid-containing storage tank is conventionally determined using a float-type mechanical gage. The float, which moves up and down in response to changes in liquid height, is attached to a gage shaft which rotates in response to the movement of the float. Thus, by calibrating the rotational position of the gage shaft with various heights of liquid, the liquid height at any given time can be determined by observing the rotational position of the gage shaft.

In many situations, liquid heights in a great many tanks, e.g., 50 to 100 or more tanks, need to be determined or monitored at the same time. Therefore, it is desirable to provide an encoder-transmitter for liquid height information from individual storage tank gages so that such information can be transmitted to a central receiving or monitoring station.

In order to give a visual indication of the liquid level at the tank site, the gage shaft is often coupled to a disc or wheel marked off in units of height, for example, inches. As the gage shaft rotates, so too does the disc or wheel. The disc or wheel is also conventionally linked to a feet indicating system so that the combination of the readings given by the disc wheel and the feet indicating system gives the height of the liquid in the tank.

Of course, the mechanical gage and the encoder assembly must be correctly calibrated so that the levels given by the mechanical gage (at the tank site) and by the encoder assembly (at the remote site) are equal to the actual level or height of liquid in the tank. In the past, such calibration has involved a number of steps and/or has been troublesome so that correct calibrations have been at least somewhat difficult to achieve.

It would be advantageous to provide new liquid level monitoring apparatus which can be effectively, easily and reliably calibrated.

SUMMARY OF THE INVENTION

New liquid level monitoring apparatus, coupling arms useful in such apparatus and methods for calibrating such apparatus have been discovered. The present monitoring apparatus are straightforward in construction and are effective and reliable in use. In particular, the present apparatus effectively provide for a clear and reliable visual indication of the liquid level at the site of the tank.

In addition, the apparatus effectively transmit liquid level information to an encoder assembly for further use. The present apparatus are easily and effectively calibrated, often using a single point calibration, so that both the mechanical gage (e.g., feet indicating system and inch wheel) and the encoder assembly display readings which are equal to the actual liquid level in the tank. A coupling arm, as described herein, is employed to provide for both effective transmission of liquid level information from the mechanical gage to the encoder assembly and to facilitate calibrating both the mechanical gage and the encoder assembly. This coupling arm is straightforward in construction and easy to use.

In one broad aspect, the present invention is directed to apparatus for monitoring the height (or level) of the liquid in a liquid-containing tank equipped with a height gage including a gage shaft which is rotatable in response to changes in the height (or level) of the liquid in the tank. The apparatus comprise an adjusting disc, an increment wheel and a coupling member or arm. The adjusting disc is coupled directly to the gage shaft and is rotatable in response to the rotation of the gage shaft. The increment wheel, which preferably is effective to give a visual indication of the height or level of liquid in the tank, for example, together with a conventional feet indicating system, in terms of feet and inches, is coupled to the adjusting disc and is rotatable with the adjusting disc. The coupling member is secured to the increment wheel and to the encoder shaft of an encoder assembly which is adapted to provide signals indicative of the height of liquid in the tank. The coupling member or arm is configured to rotate the encoder shaft in response to rotation of the increment wheel. Preferably, the coupling member is adapted or structured to avoid contacting the adjusting disc.

The coupling member transmits liquid level information directly from the gage shaft through the adjusting disc and increment wheel to the encoder shaft. Thus, the need for any additional discs, such as an adjusting drive disc, and clutching and/or gear assemblies is eliminated. The present monitoring apparatus are more straightforward and less complex than various prior art systems. In addition, and quite importantly, the present apparatus are easily and effectively calibrated due, at least in part, to the structure of the present apparatus, in particular the present coupling member.

The coupling member may be secured to the increment wheel and encoder shaft in any suitable manner. In one useful embodiment, the increment wheel includes a hole and the coupling member includes a first end portion adapted to be placed in the hole. The hole is preferably sized so that once the first end portion of the coupling member is located in the hole, the coupling member is effectively secured to the increment wheel, for example, during conditions of normal use. Alternately, the increment wheel includes a surface having two spaced apart projections extending therefrom. In this embodiment, the first end portion of the coupling member is adapted to be fitted in the space between the two projections to thereby secure the coupling member to the increment wheel under normal conditions of use. Of course, the coupling member can be removed from the increment wheel, for example, for repair, replacement or other purpose, as desired.

With regard to securing the coupling arm or member to the encoder shaft, the coupling member preferably includes an end portion, other than the first end portion noted above, which is configured into a hook defining a space. A portion of the encoder shaft is located in this space while secured to the coupling member. Preferably, the hook includes first and second sidewalls each of which includes a through hole through which the encoder shaft can be passed to facilitate securing the encoder shaft to the coupling member. A nut/screw combination can be joined to the coupling arm to ensure that the encoder shaft is secured to, and rotates in response to the rotation of, the coupling member.

The increment wheel is preferably adapted to be manually rotated independently of the adjusting wheel. This feature facilitates the calibrating of the present apparatus in a very convenient and effective manner, as is discussed elsewhere herein. More preferably, the increment wheel is clipped onto the adjusting disc. For example, the adjusting disc can include a plurality, e.g., two, three or four, spring-loaded clips at or near its periphery which are biased outwardly. The increment wheel, in the form of a hollow cylinder segment, is sized and adapted to be secured to the adjusting disc by placing the spring loaded clips in contact with the inner wall of the cylinder segment. The clips are spring-loaded sufficiently so that under normal use (liquid level monitoring) conditions the increment wheel rotates with the adjusting disc. However, if desired, for example, to calibrate the apparatus, the clips are adapted to allow the increment wheel to be rotated independently of the adjusting disc. The independent rotation of the increment wheel is an important preferred feature of the present invention.

The configuration of the coupling member is unique. In one very useful embodiment, the coupling member (or arm) includes a first end segment, a first intermediate segment, a second intermediate segment and a second end segment. The first end segment is adapted to be held by a rotating wheel, for example, the increment wheel. The first intermediate segment is joined to the first end segment and extends away from the portion of the first end segment adjacent the first intermediate segment at an angle of about 90°. The second intermediate segment is joined to the first intermediate segment and extends away from the first intermediate segment at an angle of about 90°. Thus, the combination of the portion of the first end segment adjacent the first intermediate segment and the first and second intermediate segments has a generally U-shaped configuration. The second end segment is joined to the second intermediate segment and is configured as a hook. The generally U-shaped configuration opens in one direction and the hook opens in the substantially opposing direction. The generally U-shaped configuration and the hook preferably open on substantially opposing sides of the second intermediate segment.

Preferably, the opening defined by the generally U-shaped configuration is larger, in particular wider, than the opening defined by the hook.

The hook preferably includes first and second sidewalls each of which includes a through hole, which are more preferably joined together by a through slot. An indent is preferably located near the closed end of the hook. These features of the hook are very effective in securing the encoder shaft of an encoder assembly to the coupling member. For example, the encoder shaft can be passed through each of through holes in the sidewall. An appropriately sized nut is placed adjacent the hook and is held or kept in place by the indent. A screw is passed into the hook and nut, and is tightened. This causes the configuration of the hook to be altered, for example, to "squeeze in" the sidewalls of the hook, so that the encoder shaft is effectively secured to the coupling arm.

The cross-section of the second end segment preferably is wider than the cross-section of the second intermediate segment. The first end segment and first and second intermediate segments preferably have a single substantially uniform cross section.

Another broad aspect of the present invention involves methods for calibrating the present apparatus, for example, so that the mechanical gage and the encoder assembly indicate a liquid level which is equal to the actual level or height of the liquid in the tank being monitored. In one embodiment, the calibration method comprises (1) rotating the increment wheel while maintaining the adjusting disc stationary; and (2) continuing step (1) until the liquid level value indicated by the increment wheel is equal to the actual liquid level value in the liquid-containing tank. The coupling arm or member is very effective in transmitting the rotation of the increment wheel to the encoder shaft. No additional gears, clutches, drive discs and the like are needed. This single point calibration is often all that is required to insure that both the mechanical gage and the encoder assembly indicate the actual liquid level in the tank.

After step (2), the increment wheel is preferably allowed to rotate with the adjusting disc, for example, during normal liquid level monitoring operation. In addition, it is preferred to determine the actual liquid level in the tank, for example, using a conventional hand gage or dip stick, before or during steps (1) and/or (2) so that the actual liquid level is known.

In the situation where the increment wheel and the encoder assembly do not indicate the same liquid level, the present calibration methods are adapted as follows. The encoder shaft, preferably after steps (1) and (2), is decoupled from the coupling member and then the encoder shaft is rotated, with the coupling member being held stationary. This rotating is continued until the liquid level value indicated by the encoder assembly is equal to the actual liquid level in the tank, and then the encoder shaft is recoupled or resecured to the coupling arm.

An alternate approach can be used in the event the encoder shaft includes a first portion secured to the coupling member and a second portion coupled to the first portion and secured to the remainder of the encoder assembly. This modified calibration method include steps (1) and (2) as noted above. In addition, the modified method further comprises:

decoupling the first portion of the encoder shaft from the second portion of the encoder shaft; thereafter rotating the second portion of the encoder shaft, preferably while maintaining the first portion of the encoder shaft stationary;

continuing this rotating step until this liquid level value indicated by the encoder assembly is equal to the actual liquid level value in the tank; and thereafter recoupling the first portion of the encoder shaft to the second portion of the encoder shaft. Preferably, steps (1) and (2) are completed before the decoupling step.

These and other features and aspects of the present invention are set forth in the following detailed description and claims, particularly when considered in conjunction with the accompanying drawings in which like parts bear like reference numerals.

BRIEF DESCRIPTION OF THE DRAWINGS

FIG. 1 is a schematic illustration showing a liquid level monitoring apparatus in accordance with the present invention in use.

FIG. 2 is an exploded perspective view of certain components of the apparatus shown in FIG. 1.

FIG. 3 is side plan view of the coupling member of the apparatus shown in FIG. 1.

FIG. 4 is a front plan view of a machined part from which the coupling member is formed.

FIG. 5 is a partial view showing an alternate structure of one end of the coupling member.

FIG. 6 is a view taken generally along line 6—6 in FIG. 5.

FIG. 7 is a schematic illustration of the apparatus shown in FIG. 1 in need of calibration.

FIG. 8 is a schematic illustration of the apparatus shown in FIG. 6 after it has been partially calibrated.

FIG. 9 is a schematic illustration of the apparatus shown in FIG. 6 after it has been fully calibrated.

DETAILED DESCRIPTION OF THE PREFERRED EMBODIMENTS

Referring now to the drawings, FIG. 1 illustrates an embodiment of the present monitoring apparatus, shown generally at 10, coupled to a tank level gage, shown generally at 12, and to an encoder, shown generally at 14. The apparatus 10, tank level gage 12 and encoder 14 can be sold as a unit. However, the present apparatus can be adapted to be coupled to any level gage including a shaft which rotates in response to changes in level and to any encoder which utilizes another rotatable shaft to indicate the liquid level in a tank. The encoder 14 preferably transmits signals indicative of the liquid level to a central location for monitoring. The present apparatus 10 can be considered as the link or coupling between the tank level gage 12 and the encoder 14.

An example of a useful tank level gage 12 is that sold by L&J Engineering, Inc. under the trademark Shand & Jurs Model 92021. Such a gage can be modified to include the present apparatus 10 and then sold and used as a unit. An example of a useful encoder 14 is that sold by L&J Engineering, Inc. under the trademark MCG 2000. Such an encoder, which is used to transmit data to a central location, is described in Jannotta U.S. Pat. No. 4,342,996. The disclosure of this patent is incorporated in its entirety herein by reference.

Apparatus 10 includes an inch wheel 16, a sprocketed adjusting disc 18, and a coupling arm 20. The inch wheel 16 operates in combination with a foot marker (not shown) which may be of conventional construction, such as in the Shand & Jurs Model 92021 gage. Inch wheel 16 is adapted to rotate through one revolution for each foot the liquid level in the tank varies. As the inch wheel 16 rotates, it interacts with the foot marker one time each revolution so that the tank display, shown at 22 in FIG. 1, gives the liquid level in the tank in feet and inches.

Inch wheel 16 is joined by adjusting disc 18 by spring loaded chips 24, for example, in much the same way that the corresponding parts of the Shand & Jurs Model 92021 gage are joined together. The clips 24 are located on the inwardly facing surface 26 of adjusting disc 18. The clips 24 are located and have sufficient strength to allow the inch wheel 16 to rotate with the adjusting disc 18 during normal use, that is during normal liquid level monitoring operations. However, clips 24 are such that inch wheel 16 can be rotated independently of adjusting disc 18, for example, by manually holding the adjusting disc while rotating the inch wheel. Inch wheel 16 is in the form of an open hollow cylinder and includes a through hole 28.

Adjusting wheel 18 includes a central through hole 30 which is sized and adapted to receive the threaded distal end 32 of gage shaft 34. Gage shaft 34 is secured to adjusting disc 18 by a washer 36 and retaining nut 38. In the embodiment shown, adjusting disc 18 rotates through one revolution for each one foot change in the liquid level in the tank.

The coupling arm 20 is described with reference to FIGS. 1 to 4. Coupling arm 20 includes a first end segment 40, and a first intermediate segment 42 which extends away from the first end segment at an angle of 90°. An elongated second intermediate segment 44 extends away from the first intermediate segment 42 at an angle of 90° so that the combination of the first end segment 40, and the first and second intermediate segments form a relatively wide U-shaped configuration 45. A second end segment 46 is located opposite the first end segment 40. The second end segment 46 forms a hook 49 with a relatively narrow opening. This hook 49 opens on one side of second intermediate segment 44 and the U-shaped configuration 45 opens on the opposing side of the second intermediate segment.

As shown in FIG. 4, the cross section of second end segment 46 is wider than that of the remainder of the coupling arm 20. This feature aids in securing the coupling arm 20 to the encoder shaft 50. Second end segment 46 includes two through holes 52 and 54 which are sized to receive the encoder shaft 50. The through holes 52 and 54 are joined by a relatively narrow through slot 56. One side 57 of hook 49 includes an indent 58 which is positioned at the bottom of the hook and extends upwardly into each of the sidewalls of the hook 49. Encoder shaft 50 is secured to coupling arm 20 as follows. The encoder shaft 50 is passed through through holes 52 and 54. A nut is positioned so as to be held in place by indent 58. A screw is passed into and through the space defined by the hook 49, between the through slot 56 and the encoder shaft 50, and into the nut. The screw is tightened onto the nut which eventually causes the configuration of the bottom of the hook 49 to be altered so that the through slot 56 becomes more narrow. This, in turn, causes the hook 49 to "flare out" or open further which causes the encoder shaft 50 to be secured to the coupling arm 20. The indent 58 is effective to retain or keep the nut in place.

The first end segment 40, first intermediate segment 42 and second intermediate segment 44 have a single, substantially uniform cross section.

In the embodiment shown in FIG. 3, the first end segment 40 is adapted to fit into and be held by through hole 28 in inch wheel 16. The relatively wide U-shaped configuration 45 is adapted so that the coupling arm 20 avoids (does not) touch the adjusting disc 18.

In an alternate embodiment, shown in FIGS. 5 and 6, the outer surface 60 of inch wheel 16 includes two outwardly extending, spaced apart projections 62. In this embodiment, the first end segment 40 includes a tip portion 64 which extends away from the remainder of first end segment 40 at an angle of 90°. Projections 62 are spaced apart a sufficient distance so that tip portion 64 can be placed between and held by the projections 62. In this manner, coupling arm 20 is held to inch wheel 18.

In the embodiment shown, encoder shift 50 includes two segments, first segment 70 and second segment 72, which are secured to a first coupling element 74 and a second coupling element 76 respectively. First coupling element 74 and second coupling element 76 are joined together by passing projection 80 into aperture 82.

Second coupling arm 76, as well as first coupling arm 74, are secured to the encoder shaft in substantially the same manner as coupling arm 20 is secured to encoder shaft 50. Thus, with specific reference to FIG. 2, second coupling arm 76 includes a hook 84, an indent 86, and two through holes 88 on opposing sides of the hook which are joined together by through slot 90. After the second segment 72 of the encoder shaft is passed into and through through holes 88, nut 92 is placed in indent 86 and a screw 94 is passed into the space defined by hook 84 between the slotted portion 96 of the hook and the second segment of the encoder shaft. The screw 94 is then tightened onto nut 92 which causes the slot 90 to narrow and causes the second segment 72 to be secured to the second coupling element 76. Second segment 72 can be decoupled from second coupling element 76 simply by loosening screw 94.

The operation of apparatus 10 is discussed with specific reference to FIGS. 7 to 9.

For the purposes of this illustration, the liquid level in tank 98 is actually 24 feet 6½ inches. The inch wheel 16 reads 7⅜ inches (the feet indicating system and inch wheel read 24 feet 7⅜ inches) and the encoder assembly 14 reads 24 feet 6 inches. Therefore, the inch wheel 16 needs to be calibrated to read 6½ inches (24 feet 6½ inches) and the encoder assembly 14 needs to be calibrated to read 24 feet 6½ inches.

In order to calibrate the inch wheel 16, the adjusting disc 18 is held stationary and the inch wheel is rotated (through a partial revolution) until the inch wheel reads 6½ inches, that is until the inch wheel reads the actual level of the liquid in the tank 80. This rotation of inch wheel 16 also rotates the encoder shaft 50 which causes the encoder assembly 14 to read 24 feet 5⅛ inches.

In order to calibrate the encoder assembly 14 to indicate the actual level of liquid in tank 80, two separate approaches can be taken. First, the encoder shaft 50 can be decoupled from coupling arm 20 and, while maintaining the coupling arm stationary, the encoder shaft can be rotated until the encoder assembly 14 reads 24 feet 6½ inches. At this point, the encoder shaft 50 is recoupled to coupling arm 20 and the apparatus is ready for normal liquid level monitoring operation.

Alternately, the first segment 70 of the encoder shaft 50 can be decoupled from the first coupling element 74. The second segment of the encoder shaft 50, together with the first and second coupling elements 74 and 76 are then rotated until the encoder assembly 14 reads 24 feet 6½ inches. At this point, the first segment 70 of the encoder shaft 50 is resecured to the first coupling element 74. At this point, the apparatus is completely calibrated and ready for normal liquid level monitoring operation.

The above illustrates the operation of apparatus 10 with the inch wheel 16 and encoder assembly 14 initially displaying different readings. However, it is often the case that the inch wheel 16 and encoder assembly 14 display the same liquid level value, even when the liquid level value indicated by the inch wheel does not equal the actual liquid level in the tank 98.

In this circumstance, the present invention is particularly advantageous since both the inch wheel 16 and the encoder assembly 14 can be calibrated using a single point calibration. Thus, the inch wheel 16 is calibrated as discussed above so that the inch wheel reads the actual level of the liquid in the tank 98. However, because the coupling arm 20 is directly coupled to both the inch wheel 16 and the encoder shaft 50 and since the encoder assembly 14 and the inch wheel indicate the same liquid level value, the calibration of the inch wheel also calibrates the encoder assembly.

This "single point calibration" feature of the present invention is very convenient and easy to practice. Since the present system is very easy to effectively calibrate, such calibration can be performed more frequently, for example, facilitating more accurate monitoring of liquid-containing storage tanks. Thus, after an initial calibration in which the inch wheel 16 and encoder assembly 14 are calibrated separately, the "single point calibration", as discussed herein, may be used repeatedly, on a routine basis, to insure that the inch wheel 16 and encoder assembly 14 indicate a liquid level value equal to the actual liquid level in tank 98.

The present apparatus, coupling arm or member and methods provide substantial advantages. For example, the present apparatus is very straightforward in construction and operation and reduces the complexity, and the maintenance requirements that may be involved in prior art systems. The coupling member provides for very effective transmission of liquid level information from the mechanical gage to an encoder assembly. Again, drive wheels, clutches, gears and the like are not needed because of the coupling arm or member. In addition, this coupling arm or member provides for very easy and reliable calibration of the system, which may occur at only one point, making the present calibration methods much more convenient to use than in the prior art. The fact that the present calibration methods are easy to perform makes it more likely that the present systems will be in good calibration, thereby leading to more accurate liquid level monitoring.

While this invention has been described with respect to various specific examples and embodiments, it is to be understood that the invention is not limited thereto and that it can be variously practiced within the scope of the following claims.

What is claimed is:

1. An apparatus for monitoring the height of the liquid in a liquid-containing tank equipped with a height gage including a gage shaft rotatable in response to changes in the height of the liquid in the tank, said apparatus comprising:

an adjusting disc directly coupled to the gage shaft and being rotatable in response to rotation of the gage shaft;

an increment wheel coupled to said adjusting disc and being rotatable with said adjusting disc, said increment wheel being effective to give a visual indication of the height of the liquid in the tank; and a coupling member secured directly to said increment wheel and secured to the encoder shaft of an encoder assembly adapted to provide signals indicative of the height of liquid in the liquid-containing tank, said coupling member being configured to rotate the encoder shaft in response to rotation of said increment wheel.

2. The apparatus of claim 1 wherein said coupling member is adapted to avoid contacting said adjusting disc.

3. The apparatus of claim 1 wherein said increment wheel includes a hole in an outer peripheral surface and said coupling member includes a first end portion adapted to be placed in said hole.

4. The apparatus of claim 1 wherein said increment wheel includes a surface having two spaced apart projections extending therefrom, and said coupling member includes a first end portion adapted to be fitted in the space between said two projections to thereby secure said coupling member to said increment wheel.

5. The apparatus of claim 1 wherein said coupling member includes an end portion configured as a hook defining a space in which a portion of the encoder shaft is located while secured to said coupling member.

6. The apparatus of claim 5 wherein said hook includes first and second sidewalls each of which includes a through hole through which the encoder shaft is passed to facilitate securing the encoder shaft to said coupling member.

7. The apparatus of claim 1 wherein said increment wheel is adapted to be manually rotated independently of said adjusting disc.

8. A method for calibrating the apparatus as defined in claim 1 for monitoring the height of liquid in a liquid-containing storage tank equipped with a height gage including a gage shaft rotatable in response to changes in the height of the liquid in the liquid-containing tank, said method comprising:

(1) rotating the increment wheel while maintaining the adjusting disc stationary; and (2) continuing step (1) until the liquid level value indicated by the increment wheel is equal to the actual liquid level value in the liquid-containing tank.

9. The method of claim 8 wherein steps (1) and (2) are effective to cause the signals indicative of the height of liquid in the liquid-containing tank provided by the encoder assembly to be indicative of the actual liquid level value in the liquid-containing tank.

10. The method of claim 8 which further comprises, after step (2), allowing said increment wheel to rotate with the adjusting disc.

11. The method of claim 8 which further comprises using a hand gage to determine to actual liquid level value in the liquid-containing tank.

12. The method of claim 8 which further comprises:

decoupling the encoder shaft from the coupling member; thereafter rotating the encoder shaft;

continuing said rotating until the liquid level value indicated by the encoder assembly is equal to the actual liquid level value in the liquid-containing tank; and thereafter recoupling the encoder shaft to the coupling arm.

13. The method of claim 12 wherein steps (1) and (2) are completed before said decoupling step.

14. The method of claim 12 wherein after steps (1) and (2) and said decoupling, rotating, continuing and recoupling steps are performed, steps (1) and (2) are repeated when the liquid level value indicated by the increment wheel is not equal to the actual liquid level value in the liquid-containing tank, repeating steps (1) and (2) being effective to cause the signals indicative of the height of liquid in the liquid-containing tank provided by the encoder assembly to be indicative of the actual liquid level value in the liquid-containing tank.

15. The method of claim 8 wherein the encoder shaft includes a first portion secured to said coupling member and a second portion coupled to the first portion and secured to the remainder of the encoder assembly, said method further comprising:

decoupling the first portion of the encoder shaft from the second portion of the encoder shaft; thereafter rotating the second portion of the encoder shaft;

continuing said rotating until the liquid level value indicated by the encoder assembly is equal to the actual liquid level value in the liquid-containing tank; and thereafter recoupling the first portion of the encoder shaft to the second portion of the encoder shaft.

16. The method of claim 15, wherein steps (1) and (2) are completed before said decoupling step.

17. An apparatus for monitoring the height of the liquid in a liquid-containing tank equipped with a height gage including a gage shaft rotatable in response to changes in the height of the liquid in the tank, said apparatus comprising:

an adjusting disc directly coupled to the gage shaft and being rotatable in response to rotation of the gage shaft;

an increment wheel coupled to said adjusting disc and being rotatable with said adjusting disc; and a coupling member secured to said increment wheel and to the encoder shaft of an encoder assembly adapted to provide signals indicative of the height of liquid in the liquid-containing tank, said coupling member being configured to rotate the encoder shaft in response to rotation of said increment wheel and including an end portion configured as a hook defining a space in which a portion of the encoder shaft is located while secured to said coupling member.

18. The apparatus of claim 17 wherein said hook includes first and second sidewalls each of which includes a through hole through which the encoder shaft is passed to facilitate securing the encoder shaft to said coupling member.

19. A method for calibrating the apparatus as defined in claim 18 for monitoring the height of liquid in a liquid-containing storage tank equipped with a height of gage including a gage shaft rotatable in response to changes in the height of the liquid in the liquid-containing tank, said method comprising:

(1) rotating the increment wheel while maintaining the adjusting disc stationary; and (2) continuing step (1) until the liquid level value indicated by the increment wheel is equal to the actual liquid level value in the liquid-containing tank.

20. A method for calibrating the apparatus as defined in claim 17 for monitoring the height of liquid in a liquid-containing storage tank equipped with a height of gage including a gage shaft rotatable in response to changes in the height of the liquid in the liquid-containing tank, said method comprising:

(1) rotating the increment wheel while maintaining the adjusting disc stationary; and (2) continuing step (1) until the liquid level value indicated by the increment wheel is equal to the actual liquid level value in the liquid-containing tank.

* * * * *